US008908314B2

(12) United States Patent
McCallister

(10) Patent No.: US 8,908,314 B2
(45) Date of Patent: Dec. 9, 2014

(54) DATA FILE INFORMATION BASED SELECTION OF TAPE DRIVE TAPE SPEED

(75) Inventor: Ryan P. McCallister, Erie, CO (US)

(73) Assignee: Oracle International Corporation, Redwood City, CA (US)

( * ) Notice: Subject to any disclaimer, the term of this patent is extended or adjusted under 35 U.S.C. 154(b) by 367 days.

(21) Appl. No.: 13/213,440

(22) Filed: Aug. 19, 2011

(65) Prior Publication Data

US 2013/0044389 A1 Feb. 21, 2013

(51) Int. Cl.
G11B 15/52 (2006.01)
G11B 20/10 (2006.01)
G11B 15/32 (2006.01)

(52) U.S. Cl.
CPC ............ G11B 20/10 (2013.01); G11B 2220/90 (2013.01); G11B 2020/10981 (2013.01); G11B 15/32 (2013.01)
USPC ...................................... 360/73.05

(58) Field of Classification Search
None
See application file for complete search history.

(56) References Cited

U.S. PATENT DOCUMENTS

| 5,019,923 | A  | * | 5/1991  | Ogaki ......................... 360/73.07 |
|-----------|----|---|---------|------------------------------------------|
| 5,306,573 | A  | * | 4/1994  | Pirot et al. ..................... 428/815 |
| 5,757,570 | A  | * | 5/1998  | Kiriyama et al. ............... 360/71 |
| 5,892,633 | A  | * | 4/1999  | Ayres et al. ................. 360/73.08 |
| 6,122,124 | A  | * | 9/2000  | Fasen et al. ...................... 360/51 |
| 6,349,348 | B1 | * | 2/2002  | Nishio et al. .................... 710/34 |
| 7,995,303 | B2 | * | 8/2011  | Karp et al. .................. 360/73.04 |
| 2003/0123174 | A1 | * | 7/2003  | Hennecken et al. ............ 360/51 |
| 2008/0140927 | A1 | * | 6/2008  | Katori et al. ................... 711/111 |
| 2009/0296268 | A1 | * | 12/2009 | Katagiri et al. ............. 360/77.12 |
| 2010/0188770 | A1 | * | 7/2010  | Anderson et al. ............... 360/71 |
| 2013/0044389 | A1 | * | 2/2013  | McCallister ................ 360/73.04 |

FOREIGN PATENT DOCUMENTS

JP 01084473 A * 3/1989 ............. G11B 20/10

* cited by examiner

Primary Examiner — Peter Vincent Agustin
(74) Attorney, Agent, or Firm — Brooks Kushman P.C.

(57) ABSTRACT

A microprocessor of a tape drive may identify a pattern associated with data files previously written to tape, predict information about a next data file to be written to the tape based on the pattern, select a tape rate based on the predicted information, and operate the tape drive at the selected tape rate.

20 Claims, 1 Drawing Sheet

DATA FILE INFORMATION BASED SELECTION OF TAPE DRIVE TAPE SPEED

TECHNICAL FIELD

This disclosure relates to processes, methods, algorithms and systems for selecting an operating speed for a reel motor of a tape drive.

BACKGROUND

A tape drive reads and/or writes data on a magnetic tape. Most tape drives use an internal data buffer. Tape of such a tape drive may be stopped when the buffer contains no data to be written or when the buffer is full. A tape drive provides sequential access storage. That is, a tape drive winds tape between reels to read any one particular section of data. As a result, some tape drives may have relatively slow average seek times. Despite these slow seek times, tape drives may stream data rather quickly.

Certain tape drives operate with a single fixed linear speed. Other tape drives have the capability to operate at different linear speeds. Some of these tape drives may implement algorithms that dynamically match tape speed to host data rate. If the data transfer rate becomes too slow and streaming is no longer possible, however, these tape drives decelerate and stop the tape, rewind it a short distance, position it back to the point at which streaming stopped and then resume operation.

SUMMARY

A tape speed for a tape drive may depend on whether a predicted size of a data file to be written to tape is less than a predetermined threshold size, and/or a predicted file type of the data file to be written to tape.

A tape drive system, in certain examples, may include a reel motor, a reel adapted to carry a tape and be driven by the reel motor, and a microprocessor that predicts whether a size of a data file to be written to the tape is less than a predetermined threshold size. The microprocessor operates the reel motor at a speed that depends on whether the size of the data file to be written to the tape is less than the predetermined threshold size. The reel motor may have more than one available operating speed. The microprocessor may operate the reel motor at a minimum of the available operating speeds if the size of the data file to be written to the tape is less than the predetermined threshold size. The microprocessor may determine which of the available operating speeds minimizes the total data transfer time for the data file to be written to the tape if the size of the data file to be written to the tape is greater than the predetermined threshold size, and operate the reel motor at the determined operating speed. The microprocessor may estimate a size of the data file to be written to the tape based on sizes of data files previously written to the tape. The microprocessor may identify a pattern associated with sizes of data files previously written to the tape, and predict whether the size of the data file to be written to the tape is less than the predetermined threshold size based on the pattern.

A tape drive system, in other examples, may include a reel motor, a reel adapted to carry a tape and be driven by the reel motor, and a microprocessor that predicts a type of data file to be written to the tape. The microprocessor operates the reel motor at a speed that depends on the predicted type of data file. The reel motor may have more than one available operating speed. The microprocessor may operate the reel motor at a minimum of the available operating speeds if the predicted type of data file falls within a specified category of type of data file, such as metadata. The microprocessor may determine which of the available operating speeds minimizes the total data transfer time for the data file to be written to the tape if the predicted type of data file falls within another specified category of type of data file, such as user data, and operate the reel motor at the determined operating speed. The microprocessor may estimate a size of the data file to be written to the tape based on sizes of data files previously written to the tape. The microprocessor may identify a pattern of types of data files previously written to the tape. The microprocessor may predict the type of data file to be written to the tape based on the pattern.

A tape drive may be controlled by identifying a pattern associated with data files previously written to tape, predicting information about a next data file to be written to the tape based on the pattern, selecting a tape rate based on the predicted information, and operating the tape drive at the selected tape rate. Predicting information about a next data file to be written to the tape based on the pattern may include predicting whether a size of the next data file to be written to the tape is less than a predetermined threshold size. The tape drive may have more than one available operating speed. Selecting a tape rate based on the predicted information may include selecting a minimum of the available operating speeds if the size of the next data file to be written to the tape is less than the predetermined threshold size. Predicting information about a next data file to be written to the tape based on the pattern may include predicting whether a type of the next data file to be written to the tape falls within a specified category of type of data file. Selecting a tape rate based on the predicted information may include selecting a minimum of the available operating speeds if the type of the next data file to be written to the tape falls within the specified category of type of data file. Selecting a tape rate based on the predicted information may include determining which of the available operating speeds minimizes the total data transfer time for the next data file to be written to the tape if the type of the next data file to be written to the tape does not fall within the specified category of type of data file. Selecting a tape rate based on the predicted information may further include estimating a size of the next data file to be written to the tape based on sizes of data files previously written to the tape.

Selection of tape speeds that depend on data file size and/or type may provide various advantages relative to conventional strategies for selection of tape speeds. Determining tape speeds in accordance with this disclosure may minimize, in certain situations, the time associated with transferring data to tape as the effect of tape repositioning events are taken into consideration. The above advantages and other advantages and features associated with various embodiments of the present disclosure will be readily apparent from the following detailed description when taken in connection with the accompanying drawings.

DETAILED DESCRIPTION

Figure 1:
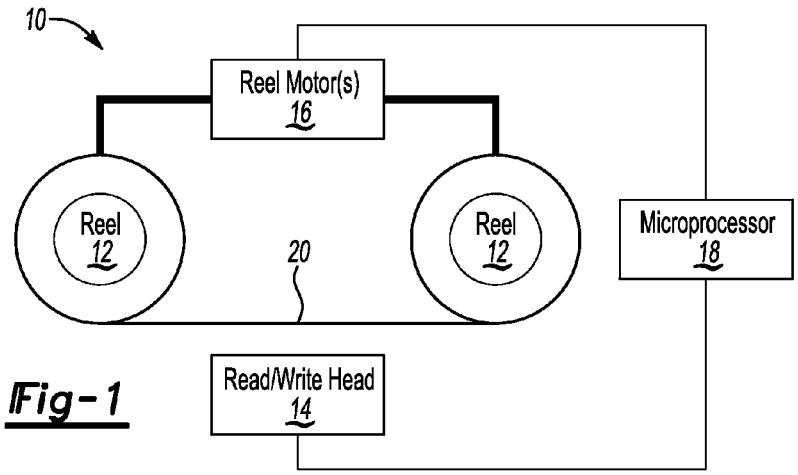
FIG. 1 is a block diagram of a tape drive system.

Embodiments of the present disclosure are described herein; however, it is to be understood that the disclosed embodiments are merely examples and other embodiments may take various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, may be desired for particular applications or implementations.

Data is often written from a buffer to tape in standard formats. One such standard format is as follows Header 1 Header2 Synchronize; User Data Synchronize; Trailer1 Trailer2 Synchronize Other formats are also known. In the above example, "Header 1 Header2" is a file, "User Data" is a file, and "Trailer1 Trailer2" is a file. "Synchronize" forces data from the buffer to the tape. Hence, a file may be defined as a set of data followed by something that forces the data to tape.

The file sizes of header and trailer files (metadata files) may be significantly less than the file sizes of user data files. For example, metadata files are typically less than 10 MB in size whereas user data files may range in size from 20 MB to 20 GB, etc.

When a "Synchronize" occurs, the tape drive must discontinue writing data, decelerate the tape to a stop, rewind the tape to a location before the end of the data, and again accelerate the tape to full speed. Data may then be written immediately after the location on the tape where writing had been discontinued. These tape repositioning events may take longer than the time needed to write data to tape, depending on the size of the file. For example, tape repositioning events may range in duration from 3.5 s for a tape rate of 150 MB/s to 4.5 s for a tape rate of 250 MB/s (the time to complete a tape repositioning event increases as tape rate increases); in contrast, 10 MB of data may be written to tape in approximately 25 ms at either of the previously mentioned example tape rates.

Conventionally, tape speed may be selected based on host rate so as to reduce wear on the tape. That is, the speed of the tape may be selected to match the speed at which the host is writing data to the buffer to minimize the number of synchronization operations performed. Recent improvements in tape durability, however, have reduced/eliminated concerns about the effects of synchronization operations on tape wear. Hence, there may be circumstances in which tape drive performance is optimized by writing metadata files at slower tape rates and writing user files at faster tape rates to minimize the time associated with tape repositioning events and to minimize the time associated with writing data. Such a control scheme may require advance knowledge of the type/size of file to be next written to tape so that the tape rate can be adjusted accordingly.

File type/size may be predicted using historical file information and/or pattern recognition techniques. As mentioned above, data may be written from a buffer to tape in standard formats. The use of these standard formats will result in files of a certain type/size being encountered with regularity. If the format is, for example, metadata file Synchronize; user file Synchronize; metadata file Synchronize inspection of a list of recently written files will reveal that (1) if the file currently being written is a user file, the next file to be written will be a metadata file, (2) if the file currently being written is a metadata file and the file previously written was a user file, the next file to be written will be a metadata file, and (3) if the file currently being written is a metadata file and the file previously written was a metadata file, the next file to be written will be a user file. Other such rules may be derived for any of the other formats.

File type may not be directly detectable in some circumstances. File size, however, may be used as a proxy for file type. Based on experience for example, it may be assumed that a file having a size less than 12 MB is a metadata file and a file having a size greater than (or equal to) 12 MB is a user file. Hence, the rules explained above may be couched in terms of file size: (1) if the file currently being written has a size greater than (or equal to) 12 MB, the next file to be written will have a size less than 12 MB; (2) if the file currently being written has a size less than 12 MB and the file previously written had a size greater than (or equal to) 12 MB, the next file to be written will have a size less than 12 MB; (3) if the file currently being written has a size less than 12 MB and the file previously written had a size less than 12 MB, the next file to be written will have a size greater than (or equal to) 12 MB.

File type/size may be used to select tape rate. If the next file to be written to tape is predicted to be a metadata file (or to have a size less than a threshold size), the slowest available tape rate may be selected. If the next file to be written to tape is a user file, the slowest available tape rate or a tape rate other than the slowest available tape rate may be selected. That is, the optimum tape rate to write a user file may depend on the size of the user file.

The exact size of the next user file to be written to tape may not be known in advance. The size, however, may be estimated using information about previously written user files. For example, the size of the next user file to be written to tape may be estimated by averaging the last n user files written to tape. Other suitable/known techniques are also contemplated.

Assuming (1) the next file to be written to tape is a user file and (2) there is more than one available tape speed, the total data transfer time for each of the available tape speeds may be determined given the estimated size of the user file to be written to tape. The tape speed yielding the minimum total data transfer time is the preferred tape speed for writing data from the user file to tape. In one example, total data transfer time=time to transfer data to tape+ ((number of tape repositioning events−1)×effective repositioning time)+last tape repositioning time+speed change delta where, time to transfer data to tape=size of file to be written to tape/tape rate number of tape repositioning events=size of file to be written to tape/(amount of data transferred in one tape repositioning event+1)

amount of data transferred in one tape repositioning event=amount of data transferred during tape repositioning+amount of data transferred during streaming amount of data transferred during tape repositioning=mechanical repositioning time×compressed rate to tape Note: Mechanical repositioning time is the time needed to decelerate the tape to a stop, rewind the tape to a location before the end of the data, and again accelerate the tape to full speed. It is a function of tape rate and the type of tape drive being used. Compressed rate to tape is the rate at which the host provides data after compression. It is a function of the type of tape drive being used. The mechanical repositioning time and compressed rate to tape may be determined by system testing.

> amount of data transferred during streaming=(amount of data transferred during tape repositioning/ (tape rate−compressed rate to tape))×compressed rate to tape > effective repositioning time=mechanical repositioning time{if amount of data transferred during tape repositioning>write threshold}

Note: Write threshold is the minimum amount of data needed in the buffer in order to start writing. It is defined by the type of tape drive being used.

> effective repositioning time=(write threshold/compressed rate to tape)+ramp time {if amount of data transferred during tape repositioning≤write threshold}

Note: Ramp time is the time need to accelerate the tape from a stop to full speed. It is a function of tape rate and the type of tape drive being used. Ramp time may be determined by system testing.

> last tape repositioning time=remaining data/compressed rate to tape

Note: The value of last tape repositioning time is limited by the value of the mechanical repositioning time. If the remaining data takes less time to transfer than the mechanical repositioning time, the system will wait until the tape repositioning is completed. The value of last tape repositioning time is also limited by the effective repositioning time because the remaining data may be transferred during streaming.

> speed change delta=high speed to low speed mechanical tape repositioning time−low speed mechanical tape repositioning time{if the tape drive is currently operating at high speed, and low speed is being considered}

Note: High speed to low speed mechanical tape repositioning time is the time needed to decelerate the tape from high speed to a stop, rewind the tape to a location before the end of the data, and accelerate the tape to low speed. Low speed mechanical tape repositioning time is the time needed to decelerate the tape from low speed to a stop, rewind the tape to a location before the end of the data, and again accelerate the tape to low speed. These times are functions of the tape rates and the type of tape drive being used, and may be determined by system testing.

> speed change delta=0{otherwise}

Referring to FIG. 1, a tape drive system 10 includes, in this example, a pair of reels 12, a read/write head 14, a reel motor(s) 16, and a microprocessor 18. Other arrangements are, of course, also possible. The reels 12 rotatively carry a tape 20 on which data may be read from and/or written to by the read/write head 14. The reel motor(s) 16 mechanically drives the reels 12 as indicated by thick line. The read/write head 14 and reel motor(s) 16 are in communication with/under the control of the microprocessor 18 as indicated by thin line. That is, the microprocessor 18 may cause the read/write head 14 to read data from and/or write data to the tape 20, as well as cause the reel motor(s) 16 to operate at different speeds resulting in different tape rates.

Figure 2:
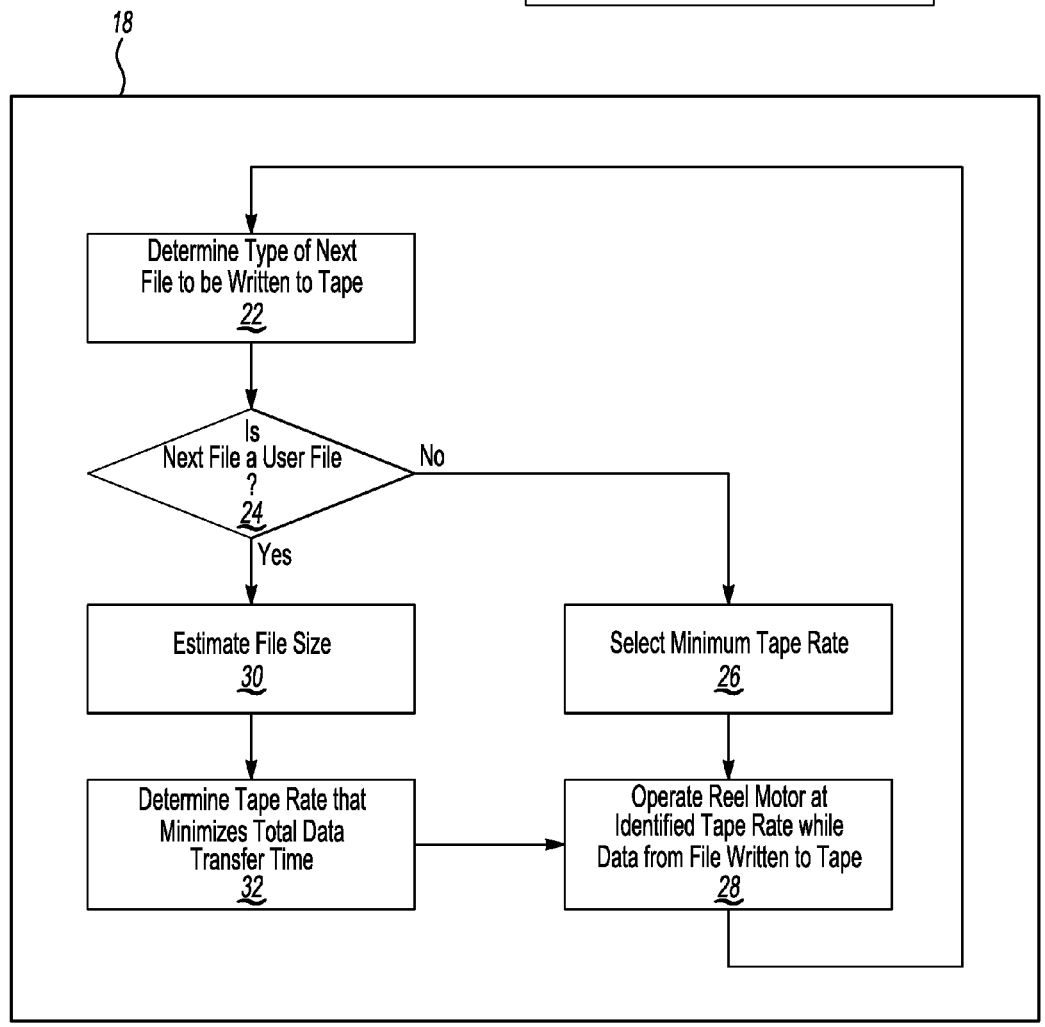
FIG. 2 is a flow chart of an algorithm for selecting tape drive tape speed.

Referring to FIG. 2, the type of the next file to be written to tape is determined at operation 22. For example, the microprocessor 18 may examine a log of the last n files written to tape in an effort to anticipate the type of file to be next written.

At operation 24, it is determined whether the next file to be written is a user file. If no, the minimum tape rate is selected at operation 26. If, for example, available tape rates include 160 MB/s, 210 MB/s, and 275 MB/s, the microprocessor 18 may select the 160 MB/s rate. At operation 28, the reel motor (s) 16 is caused to operate at a speed such that the tape rate is 160 MB/s (and the data file is written to the tape 20). The algorithm then returns to operation 22.

In other examples, operations 22 and 24 may be substituted with a determination regarding whether a predicted size of the next file to be written to tape is less than a predetermined threshold size. The predetermined threshold size may be that size for which the time needed to complete a tape repositioning event is greater than the time needed to transfer data. If yes, the algorithm proceeds to operation 26. If no, the algorithm proceeds to operation 30. Other scenarios are also possible.

Returning to operation 24, if yes, the size of the file to be next written to tape is estimated at operation 30. The microprocessor 18, for example, may average the size of the last several user files written to tape. This average value is assumed to be the size of the next file to be written to tape. At operation 32, the total data transfer time is determined for each of the available tape rates, and the tape rate that results in the minimum value for total data transfer time is identified. In this example, it is assumed that the 210 MB/s tape rate yields the minimum total data transfer time. The algorithm then proceeds to operation 28 in which the reel motor(s) 16 is caused to operate at a speed such that the tape rate is 210 MB/s. The algorithm then returns to operation 22.

The processes, methods, or algorithms disclosed herein may be deliverable to/implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure and claims. As previously described, the features of various embodiments may be combined to form further embodiments of the invention that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to: cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A tape drive system comprising:
   a reel motor;
   a reel adapted to carry a tape and be driven by the reel motor; and
   a microprocessor configured to predict whether a size of a data file to be written to the tape is less than a predetermined threshold size and to operate the reel motor at a speed that depends on whether the size of the data file to be written to the tape is less than the predetermined threshold size.

2. The system of claim 1 wherein the reel motor has more than one available operating speed and wherein the microprocessor is further configured to operate the reel motor at a minimum of the available operating speeds if the size of the data file to be written to the tape is less than the predetermined threshold size.

3. The system of claim 2 wherein the microprocessor is further configured to determine which of the available operating speeds minimizes total data transfer time for the data file to be written to the tape if the size of the data file to be written to the tape is greater than the predetermined threshold size and to operate the reel motor at the determined operating speed.

4. The system of claim 3 wherein the microprocessor is further configured to estimate a size of the data file to be written to the tape based on sizes of data files previously written to the tape.

5. The system of claim 1 wherein the microprocessor is further configured to identify a pattern associated with sizes of data files previously written to the tape.

6. The system of claim 5 wherein the microprocessor is further configured to predict whether the size of the data file to be written to the tape is less than the predetermined threshold size based on the pattern.

7. A tape drive system comprising:
   a reel motor;
   a reel adapted to carry a tape and be driven by the reel motor; and
   a microprocessor configured to predict a type of data file to be written to the tape and to operate the reel motor at a speed that depends on the predicted type of data file.

8. The system of claim 7 wherein the reel motor has more than one available operating speed and wherein the microprocessor is further configured to operate the reel motor at a minimum of the available operating speeds if the predicted type of data file falls within a specified category of type of data file.

9. The system of claim 8 wherein the specified category of type of data file is metadata.

10. The system of claim 8 wherein the microprocessor is further configured to determine which of the available operating speeds minimizes total data transfer time for the data file to be written to the tape if the predicted type of data file falls within another specified category of type of data file and to operate the reel motor at the determined operating speed.

11. The system of claim 10 wherein the microprocessor is further configured to estimate a size of the data file to be written to the tape based on sizes of data files previously written to the tape.

12. The system of claim 7 wherein the microprocessor is further configured to identify a pattern of types of data files previously written to the tape.

13. The system of claim 12 wherein the microprocessor is further configured to predict the type of data file to be written to the tape based on the pattern.

14. A method for controlling a tape drive comprising:
    identifying a pattern associated with data files previously written to tape;
    predicting information about a next data file to be written to the tape based on the pattern;
    selecting a tape rate based on the predicted information; and
    operating the tape drive at the selected tape rate.

15. The method of claim 14 wherein predicting information about a next data file to be written to the tape based on the pattern includes predicting whether a size of the next data file to be written to the tape is less than a predetermined threshold size.

16. The method of claim 15 wherein the tape drive has more than one available operating speed and wherein selecting a tape rate based on the predicted information includes selecting a minimum of the available operating speeds if the size of the next data file to be written to the tape is less than the predetermined threshold size.

17. The method of claim 14 wherein predicting information about a next data file to be written to the tape based on the pattern includes predicting whether a type of the next data file to be written to the tape falls within a specified category of type of data file.

18. The method of claim 17 wherein the tape drive has more than one available operating speed and wherein selecting a tape rate based on the predicted information includes selecting a minimum of the available operating speeds if the type of the next data file to be written to the tape falls within the specified category of type of data file.

19. The method of claim 18 wherein selecting a tape rate based on the predicted information includes determining which of the available operating speeds minimizes total data transfer time for the next data file to be written to the tape if the type of the next data file to be written to the tape does not fall within the specified category of type of data file.

20. The method of claim 19 wherein selecting a tape rate based on the predicted information further includes estimating a size of the next data file to be written to the tape based on sizes of data files previously written to the tape.

* * * * *